US 9,163,385 B2

(12) United States Patent
Lavergne et al.

(10) Patent No.: US 9,163,385 B2
(45) Date of Patent: Oct. 20, 2015

(54) WORKING DEVICE

(75) Inventors: Hans-Peter Lavergne, Trunkelsberg (DE); Philipp Egenrieder, Ulm (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 770 days.

(21) Appl. No.: 13/298,696

(22) Filed: Nov. 17, 2011

(65) Prior Publication Data
US 2012/0291624 A1 Nov. 22, 2012

(30) Foreign Application Priority Data

Nov. 17, 2010 (DE) .................. 10 2010 051 651

(51) Int. Cl.
*E02F 9/22* (2006.01)
*F16F 9/02* (2006.01)
(52) U.S. Cl.
CPC ............ *E02F 9/2217* (2013.01); *E02F 9/2275* (2013.01); *F16F 9/0236* (2013.01)
(58) Field of Classification Search
CPC .... F16F 9/0236; F04B 47/145; E02F 9/2217; E02F 9/2275
USPC ................. 60/372, 414, 415; 91/508
See application file for complete search history.

(56) References Cited

U.S. PATENT DOCUMENTS

| 6,918,247 | B1 * | 7/2005 | Warner | .......................... 60/414 |
| 7,104,052 | B1 | 9/2006 | Hindman | |
| 2005/0098326 | A1 | 5/2005 | Tosen et al. | |
| 2006/0207246 | A1 * | 9/2006 | Hindman | .......................... 60/413 |
| 2007/0068754 | A1 | 3/2007 | Furgala | |
| 2010/0018195 | A1 * | 1/2010 | Stanger et al. | .................. 60/414 |

FOREIGN PATENT DOCUMENTS

| CN | 101435451 A | 5/2009 |
| DE | 2726246 | 12/1978 |
| DE | 10011947 A1 | 9/2001 |
| DE | 102007050350 | 4/2009 |
| DE | 102008034582 | 1/2010 |
| DE | 102010032415 A1 | 2/2012 |
| EP | 1703142 | 9/2006 |
| EP | 2146009 A1 | 1/2010 |
| GB | 2000227 | 1/1979 |
| WO | 9716371 A1 | 5/1997 |
| WO | 2004113622 A1 | 12/2004 |
| WO | 2008013466 A1 | 1/2008 |

OTHER PUBLICATIONS

First Office Action and Search Report from Patent Office of the People's Republic of China dated Apr. 7, 2015 for Chinese Patent Application No. 201110374937.1.

* cited by examiner

*Primary Examiner* — Nathaniel Wiehe
*Assistant Examiner* — Abiy Teka
(74) *Attorney, Agent, or Firm* — Dilworth & Barrese, LLP

(57) ABSTRACT

The present invention relates to a working device having an element movable via at least one working cylinder, with at least one energy recovery cylinder being provided for recovering energy from the movement of the movable element and having a chamber filled with gas. In this respect, the chamber filled with gas is in operative communication with a pressure store which counters a pressure increase in the chamber filled with gas at least from a maximum pressure onward.

19 Claims, 3 Drawing Sheets

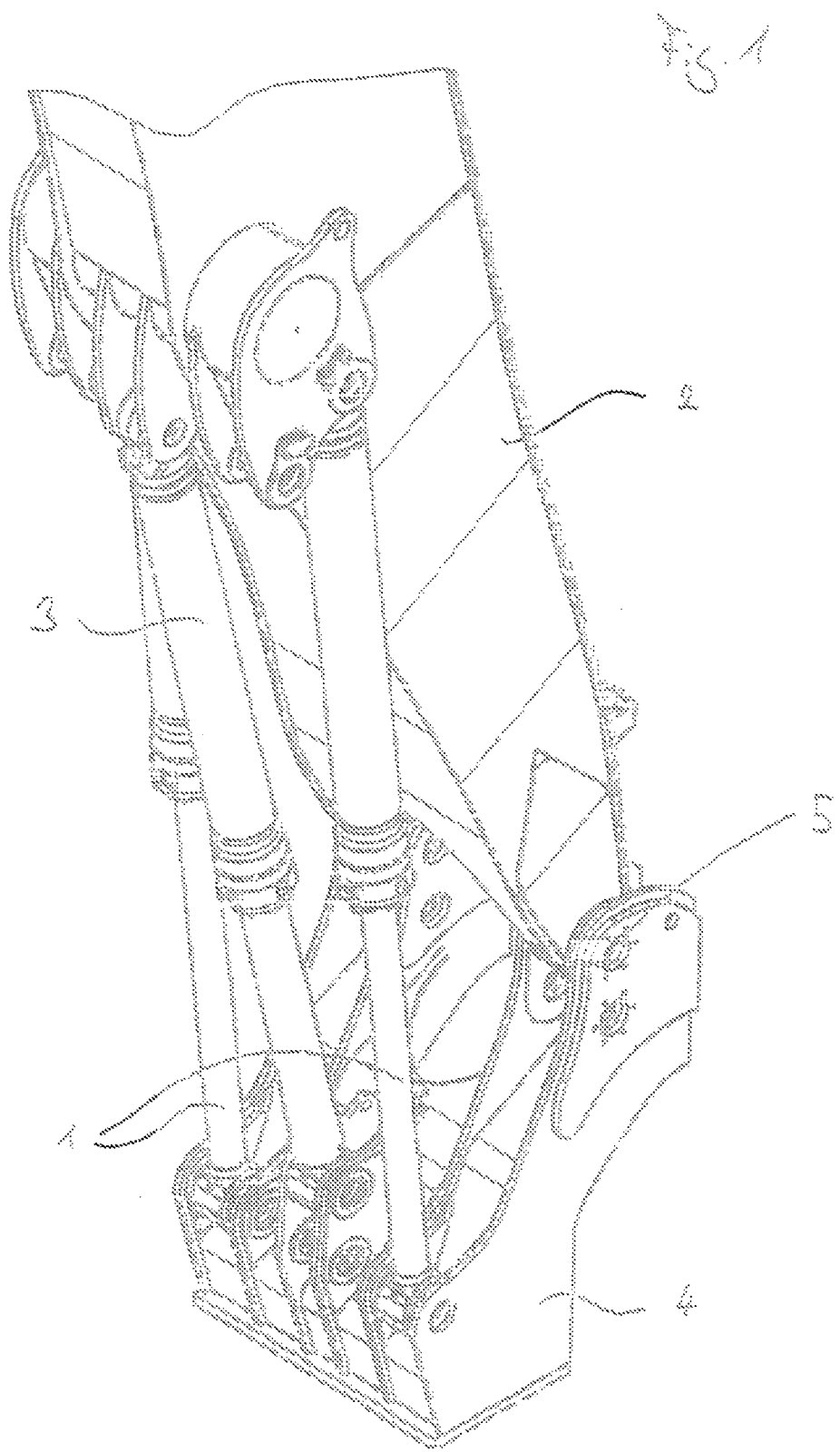

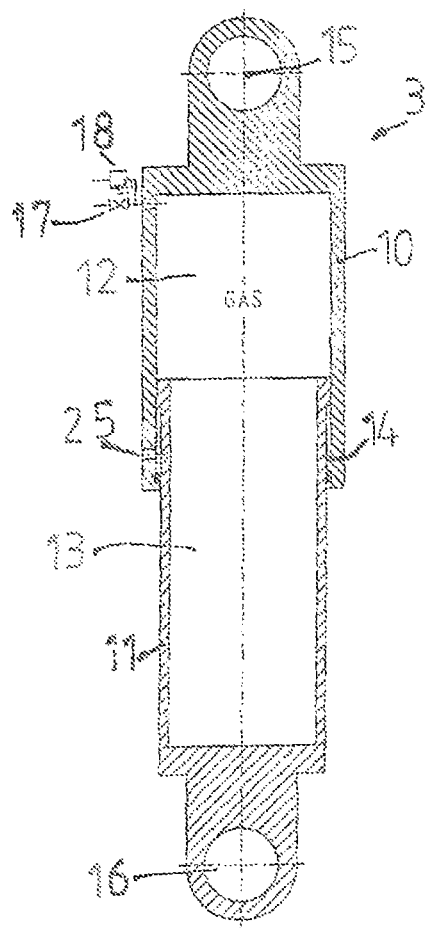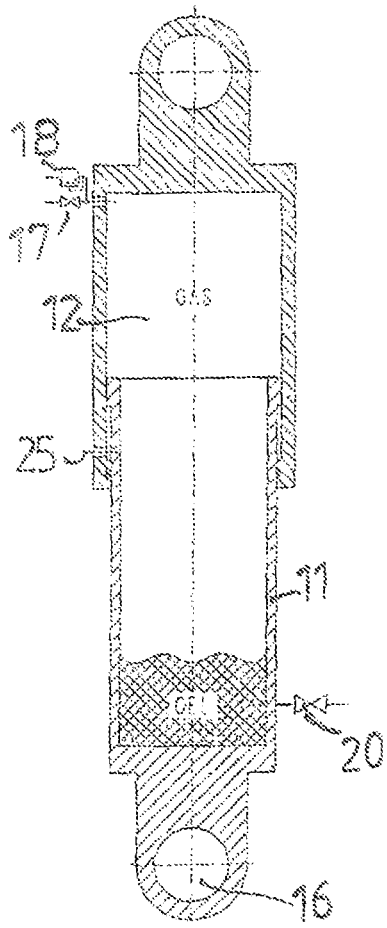

WORKING DEVICE

BACKGROUND OF THE INVENTION

The present invention relates to a working device having an element movable via at least one working cylinder, with at least one energy recovery cylinder being provided for recovering energy from the movement of the movable element and having a chamber filled with gas. The present invention in this respect in particular relates to a movable working device, in particular to an excavator or to a machine for material handling.

The chamber of the energy recovery cylinder filled with gas is compressed on a lowering of the movable element in such working devices and thus stores the potential energy in order to output it again on an upward movement of the movable element to support the working hydraulic cylinder.

A working device is known from DE 10 2008 034 582 A1 in which the chamber of the energy recovery cylinder filled with gas is formed by the base side of the energy recovery cylinder filled with gas and by the hollow piston rod of the energy recovery cylinder. In this respect, a filling valve for filling the chamber filled with gas is provided and a relief valve is provided by which gas can escape on an exceeding of a preset pressure limit to avoid a bursting of the cylinder.

SUMMARY OF THE INVENTION

It is the object of the present invention to improve a function of a known working device having an energy recovery cylinder, in particular with respect to the long-term usability and the energy efficiency.

This object is achieved in accordance with the invention by a working device in accordance with the description herein. This working device in accordance with the invention includes a movable element which can be moved via at least one working hydraulic cylinder. At least one energy recovery cylinder is furthermore provided for energy recovery from the movement of the movable element. The energy recovery cylinder in this respect includes a chamber filled with gas. Provision is made in accordance with the invention that the chamber filled with gas is in operative communication with a pressure store which counters a pressure increase in the chamber filled with gas at least from a maximum pressure onward.

The inventors of the present invention have found in experiments with energy recovery cylinders having a chamber filled with gas that an undesirably high pressure increase can occur in the chamber filled with gas, in particular on fast movements and high compression. In accordance with the invention, the present invention counters this in that the chamber filled with gas is set into operative communication with a further pressure store. The latter counters the unwanted pressure increase in the chamber filled with gas at least from a maximum pressure onward and thus reduces the further pressure increase above the maximum pressure in the chamber filled with gas.

The pressure store advantageously has a predefined operating pressure for this purpose which defines the maximum pressure. If the pressure store and the chamber filled with gas are directly in communication with one another, in particular the operating pressure of the pressure store corresponds to the maximum pressure from which onward the pressure store counters a further pressure increase in the chamber filled with gas.

The pressure store in this respect in an advantageous manner does not have any influence on the pressure in the chamber filled with gas below the maximum pressure. The pressure store in this respect in particular does not expand any further on a drop of the pressure in the chamber filled with gas below the maximum pressure.

Provision can alternatively or additionally be made that the pressure store has a characteristic differing from the chamber filled with gas. Provision can in this respect in particular be made that the pressure store has a smaller influence on the pressure in the chamber filled with gas below the maximum pressure than above the maximum pressure. The pressure store thus counters a further pressure increase of the chamber filled with gas more above the maximum pressure than below.

The present invention can in particular be used in such working devices in which a pressure-relief valve is provided for the chamber filled with gas. The maximum pressure is in this respect advantageously below the triggering pressure of the pressure-relief valve. It can thus be prevented by the pressure store that gas escapes from the chamber filled with gas through the pressure-relief valve on a brief exceeding of the maximum pressure.

The pressure store in accordance with the invention in this respect in particular equalizes pressure peaks which can occur briefly during the compression of the chamber filled with gas. A loss of gas in the chamber filled with gas thus no longer occurs thanks to the pressure store in accordance with the invention. Furthermore, energy is also no longer lost.

The maximum pressure in accordance with the invention is advantageously above the pressures which are present in a static working device and with a maximum load of the movable element in the chamber filled with gas. The pressure store is then designed only to equalize dynamic pressure peaks on fast movements and/or on a substantially complete compression of the chamber filled with gas.

In the following, different embodiments of a pressure store or of an operative communication with the chamber filled with gas will now be described in more detail in the following:

The present invention can in this respect in particular be used in an energy recovery cylinder which is filled with gas at the base side and has a hollow piston rod. The pressure store can in this respect be attached either to such an energy recovery cylinder or be integrated in such an energy recovery cylinder.

In an embodiment of the present invention, a piston is in this respect displaceably supported in the hollow piston rod of the energy recovery cylinder, with the base side filled with gas being in operative communication with the pressure store via this piston.

The operative communication between the pressure store and the chamber filled with gas can in this respect take place either directly or indirectly. An indirect communication can take place, for example, by a hydraulic communication between the chamber filled with gas and a hydraulic pressure store.

In a first embodiment, the pressure store is in fluid communication with the chamber filled with gas via a line. An external pressure store is in particular used here which is arranged outside the energy store cylinder. In an advantageous embodiment, the pressure store can in this respect be arranged at the energy recovery cylinder. Alternatively, the pressure store can also be integrated in the energy recovery cylinder.

A region in the interior of the hollow piston rod separated from the base side by the piston can, for example, be in hydraulic communication with an energy store. In a preferred embodiment of the present invention, however, the region in the interior of the hollow piston rod separated from the base side by the piston is filled with gas. The total pressure store is thus in particular arranged in the interior of the hollow piston rod.

In an advantageous manner, the pressure store in accordance with the invention has an operating pressure and does not continue to expand when it is fallen below and thus no longer has any influence on the pressure in the chamber filled with gas. This can in particular take place in that the piston of a piston store is stopped by an abutment in a position which corresponds to the operating pressure.

In a further advantageous manner, the pressure store is constantly in operative communication with the chamber filled with gas at least during an operating mode of the working device. It can hereby be ensured that pressure peaks are reliably dealt with. It can thus in particular be prevented that the security against bursting is activated on the occurrence of brief pressure peaks. The pressure store is in this respect in particular in operative communication with the chamber filled with gas without the interposition of control members. Provision can in particular be made that the gas from the chamber filled with gas acts directly onto a movable surface of the pressure store.

In an advantageous manner, the pressure store in accordance with the invention is designed as a gas store. In a further advantageous manner, it in this respect has a filling valve for filling with gas. The pressure store can furthermore also have a pressure relief valve to avoid damage to the pressure store. In this respect, the triggering pressure of the pressure relief valve of the pressure store is advantageously greater than the triggering pressure of a pressure relief valve provided for the chamber filled with gas.

If the pressure store is integrated into the energy recovery cylinder, as was presented above, a filling valve is advantageously provided at the base side and a pressure relief valve for the base side filled with gas. In a further advantageous manner, a filling valve and/or a pressure relief valve is/are preferably provided for the region in the interior of the hollow piston rod separated from the base side by the piston.

In addition to the working device, the present invention furthermore includes an energy recovery cylinder for a working device as was described above. The energy recovery cylinder in accordance with the invention in this respect in particular has a chamber which is filled with gas and which is in operative communication with a pressure store so that a pressure increase in the chamber filled with gas is at least reduced by the pressure store from a maximum pressure onward.

The energy recovery cylinder in accordance with the invention in this respect in particular has a base side filled with gas and a hollow piston rod. The energy recovery cylinder is in this respect advantageously designed as was described above.

Particularly preferred possibilities of use of the present invention will now be briefly described again.

The working device in accordance with the invention is in particular a movable working device, in particular an excavator or a machine for material handling.

It has an element movable via at least one working hydraulic cylinder, with at least one energy recovery cylinder being provided for recovering energy from the movement of the movable element.

In this respect, the energy recovery cylinder serves with the chamber filled with gas itself as an energy store for the energy recovery from the movement of the movable element. The space formed by the base side of the energy recovery hydraulic cylinder is in this respect advantageously filled with pressurized gas which is compressed on a movement of the piston rod toward the base. The energy stored in this process is then available again on an upward movement of the piston rod to support the working hydraulic cylinder. In a further advantageous manner, the piston rod of the energy recovery cylinder is hollow and open toward the base side so that the interior of the piston rod forms a part of the chamber filled with gas.

The movable element of the working device in accordance with the invention is advantageously pivotally connected to the working device pivotable about a vertical axis of rotation and is pivotable in a vertical pivoting plane via the working hydraulic cylinder(s). The movable element is in this respect in particular the arm of an excavator or the boom of a machine for material handling. Further advantageously, the mobile working device in this respect has an undercarriage with traveling gear and a superstructure arranged rotatably about a vertical axis of rotation thereon to which the movable element is pivotally connected.

In this respect, a piece of working equipment, for example a shovel or a grip, can be arranged at the movable element. On the lowering of the movable element, the potential energy of the movable element and of the piece of working equipment is stored via the energy recovery hydraulic cylinder in order again to at least partly compensate the equipment weight on the upward movement of the movable element. Less energy hereby has to be applied via the working hydraulic cylinder to move the movable element upwardly. The energy balance of the working device is hereby improved since less installed engine power is required and the fuel consumption is lowered.

The energy recovery hydraulic cylinder in accordance with the invention is in this respect advantageously arranged like the working hydraulic cylinder or cylinders between a superstructure of the working device and the movable element. The energy recovery hydraulic cylinder thus moves simultaneously with the working hydraulic cylinder on a movement of the movable element.

BRIEF DESCRIPTION OF THE DRAWINGS

The present invention will now be described in more detail with reference to embodiments and to drawings.

There are shown

FIG. 1 an embodiment of a working device in accordance with the invention with two working hydraulic cylinders and with one energy recovery hydraulic cylinder;

FIG. 2a a schematic diagram of a first variant of the energy recovery cylinder in accordance with the invention;

FIG. 2b a schematic diagram of a second variant of the energy recovery cylinder in accordance with the invention;

DESCRIPTION OF THE PREFERRED EMBODIMENTS

Figure 3:
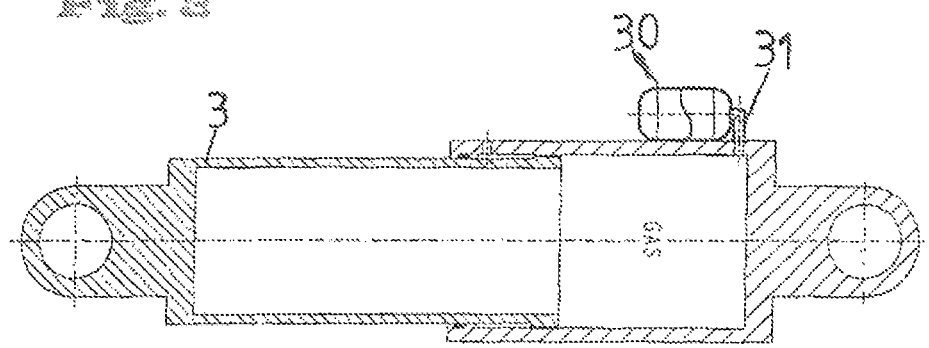
FIG. 3 a first embodiment of an energy recovery cylinder in accordance with the invention with an external pressure store.

An embodiment of a working device having an energy recovery cylinder in which the present invention can be used will now initially be described generally with reference to FIGS. 1 and 2.

The working device in this respect includes a movable element 2 which is pivotally connected via a horizontally extending pivot axle 5 to a welded construction 4 of the working device. The working device is in this respect a hydraulic excavator, the movable element 2 is the excavator arm which is pivotally connected to the superstructure of the excavator. The superstructure itself is in this respect rotatably connected about a vertical axis of rotation to an undercarriage with a chassis.

To move the movable element 2, two working hydraulic cylinders 1 are provided in this respect which are pivotally connected via corresponding pivotal connection points to the movable element 2 as well as to the welded construction 4 of the superstructure. Furthermore, an embodiment of an energy recovery cylinder 3 in accordance with the invention is provided which, like the working hydraulic cylinders 1, is arranged between the movable element 2 and the superstructure of the working device 4 and which serves the recovery of energy from the movement of the movable element. The energy recovery cylinder 3 is in this respect arranged between the two working hydraulic cylinders 1.

In this respect, a working tool, for example an excavator shovel, is arranged at the movable element 2, in this case the excavator boom. On the lowering of the movable element 2, the potential energy of the movable element as well as of the working tool should now be recovered and stored to at least partly compensate the static forces which would otherwise be exerted on the working hydraulic cylinders due to the weight of the movable element and of the working tool on the upward movement of the movable element and thus to have to supply less energy by means of the working hydraulic cylinder 1. The hydraulic cylinder in accordance with the invention advantageously has a chamber filled with gas for this purpose. On a lowering of the movable element, the gas in the chamber of the energy recovery cylinder filled with gas is compressed, whereas it expands on the raising of the movable element and in so doing supports the working hydraulic cylinder 1. For this purpose, the energy recovery cylinder in accordance with the invention is filled with gas at the base side and furthermore has a hollow piston rod open toward the base side.

Schematic drawings of two variants of an energy recovery cylinder 3 are now shown in FIGS. 2*a* and 2*b*. Both embodiments in this respect have a cylinder 10 in which a piston rod 11 is axially displaceably journalled. The piston rod 11 in this respect has the shape of a hollow cylinder so that a hollow space 13 results in the interior of the piston rod 11 and is open toward the base side 12 of the cylinder. The base side 12 of the energy recovery cylinder 3 and the hollow space 13 in the interior of the piston rod 11 in this respect form a connected chamber which is filled with pressurized gas. On a movement of the piston rod 11 in the cylinder 10, the size of the base side 12 changes so that the volume filled with gas substantially corresponds to the hollow space 13 in the interior of the hollow piston rod with a fully pushed in piston rod 11, but corresponds in contrast to the volume of this hollow space 13 plus the volume of the cylinder 10 with a fully pushed out piston rod.

The energy recovery cylinder in this respect has a support point 15 at the base side and a support point 16 at the piston rod side with which it is pivotally connected to the working device and to the moving element. The energy recovery cylinder is in this respect pivotally connected between the movable element and the working device so that the piston rod 11 is moved downward toward the base of the energy recovery cylinder by the weight of the movable element and of the working tool so that the gas volume is compressed. In this respect, due to the embodiment in accordance with the invention of the energy recovery cylinder with a hollow piston rod 11, sufficient gas volume is also present with a retracted cylinder to enable a shallow pressure increase on the lowering of the working tool. Conversely, on an upward movement of the movable element, part of the weight rests on the gas volume in the energy recovery cylinder so that the working hydraulic cylinders no longer have to apply the complete static load.

The energy recovery cylinder in accordance with the invention has a filling valve 17 for the filling the chamber with gas and a pressure relief valve 18 for limiting the gas pressure. In the first embodiment in FIG. 2*a*, the filling valve 17 and the pressure relief valve 18 are arranged at the base side in this respect. In the second embodiment shown in FIG. 2*b*, the filling valve 17 and the pressure relief valve 18 are in contrast arranged at the piston rod side.

The energy recovery cylinders shown in FIGS. 2*a* and 2*b* are a two-sided hydraulic cylinder so that a ring space 14 is provided which can be connected via a connector 12 to a hydraulic system of the working device. The base side can also have a connector via which it can be connected to a hydraulic system of the working device.

As shown in FIG. 2*b*, the gas volume in the energy recovery cylinder can be changed by the supply of oil to or the conducting of oil from the energy recovery cylinder. For this purpose, a connector 20 is shown in the second embodiment in FIG. 2*b* for the supply with oil via which the base space of the energy recovery cylinder can be connected to a hydraulic system of the working device.

The inventors of the present invention have found that brief pressure peaks in particular arise in the cylinder on a fast retraction and/or on a complete compression of the chamber of the energy recovery cylinder filled with gas. These pressure peaks only occur for a very brief time, but without countermeasures can activate the pressure relief valve 18 which was installed as a security against bursting. This would result in a constant loss of gas at pressure peaks in operation of the energy recovery cylinder. In addition, energy is hereby lost by the escape of the compressed gas.

In accordance with the invention, the chamber filled with gas is in operative communication with a pressure store which counters a pressure increase in the chamber filled with gas at least from a maximum pressure onward. The additional pressure store in accordance with the invention can thus deal with the pressure peaks and prevent an activation of the pressure relief valve.

The pressure peaks occurring for a very short time during the compression can thus be dealt with via the pressure store so that, on the one hand, no gas is lost from the chamber filled with gas and, on the other hand, the energy from the pressure peaks can be stored and returned via the pressure store.

The pressure store in accordance with the invention in this respect has an operating pressure which is greater than or equal to the operating pressure in the gas cylinder. This operating pressure is in this respect in particular lower than the pressure at which the pressure relief valve 18 of the chamber filled with gas is triggered. The operating pressure of the pressure store should, however, in this respect, be so high that it does not substantially influence the behavior of the chamber filled with gas in the static state or at only low speeds.

Such a pressure store can in particular be realized in that the movable surface of the pressure store which is in operative communication with the chamber filled with gas is only movable up to a point which corresponds to the desired maximum pressure in the chamber filled with gas. If the additional pressure store is designed as a piston store, an abutment for the piston can be provided, for example, which prevents a further expansion of the piston store on a falling below of the maximum pressure in the chamber filled with gas. In this respect, other pressure stores are also conceivable as long as their characteristics correspondingly drop below the maximum pressure.

In FIG. 3, a first embodiment of an energy recovery cylinder in accordance with the invention is shown. The energy recovery cylinder 3 can in this respect be structured as was shown above with respect to FIGS. 1 and 2. The chamber filled with gas in the interior of the energy recovery cylinder is in this respect in operative communication via a line 31 with an external pressure store 30. In this respect, the gas in the chamber filled with gas is in particular in direct fluid communication via this line 31 with a changing volume in the interior of the pressure store 30. In this respect, the pressure store is advantageously attached to the energy recovery cylinder 30 at the outside.

Figure 4:
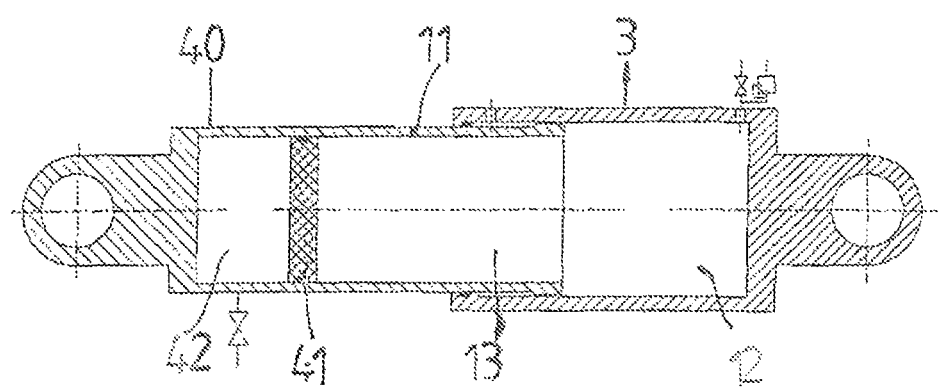
FIG. 4 a second embodiment of an energy recovery cylinder in accordance with the invention with an internal pressure store.

In FIG. 4, a second embodiment of the present invention is shown in which an internal pressure store 40 is provided. The energy recovery cylinder 3 is in this respect in turn structured as was already shown in more detail with respect to FIGS. 1 and 2a. It in this respect in particular has a base side 12 filled with gas and a piston rod 11 which is made hollow. A piston 41 is movably arranged in the interior 13 of the piston rod 11 in this respect. The region 42 in the interior of the piston 11 separated from the base side 12 via the piston 41 is in this respect likewise filled with gas. An internal additional pressure store is hereby provided to deal with pressure peaks. In this respect, an abutment is advantageously provided by which the movement of the piston 41 in the direction of the base side 12 is limited. The additional pressure store hereby has no influence on the pressure conditions in the chamber 12 filled with gas below a maximum pressure which corresponds to the pressure in the interior of the chamber 42 with a maximally extended piston 41. A sufficiently high pressure in the base side 12 filled with gas can hereby be achieved in normal operation.

On an exceeding of the maximum value of the pressure, the piston 41 is displaced in contrast and a larger space volume hereby arises in the energy recovery gas cylinder. The pressure increase curve is flattened out due to this volume increase and a response of the pressure relief valve is prevented.

In this respect, the pressure relief valve 18 is advantageously arranged at the base side as shown in FIG. 2a. In further advantageous manner, as shown in FIG. 2a, a filling valve for filling the base side is provided.

In further advantageous manner, a second pressure relief valve is furthermore provided at the piston side and/or a second filling valve for the chamber 42 of the pressure store 40 is provided. They can be arranged as shown in FIG. 2b. The operating pressure of the pressure store 40 can thus be set by setting the gas quantity in the chamber 42.

A premature release of the security against bursting by brief pressure peaks can thus be avoided in a simple manner by the present invention. The long-term operating suitability of the energy recovery cylinder and the energy balance are hereby improved.

The present invention was shown in the embodiments with reference to a working device in which the movable element is pivotably connected to a horizontal pivot axle and both the working cylinder and the energy recovery cylinder are arranged at the movable element.

The energy recovery cylinder in accordance with the invention can, however, also advantageously be used in any other desired working devices in which energy should be recovered from the movement of an element to be moved.

The invention claimed is:

1. A working device or a machine for material handling, having an element movable via at least one working hydraulic cylinder, wherein
   at least one energy recovery cylinder is provided for recovering energy from the movement of the movable element, said energy recovery cylinder having a chamber filled with gas, and
   the chamber filled with gas is in operative communication with a pressure store which counters a pressure increase in the chamber filled with gas at least from a maximum pressure onward
   wherein the pressure store is integrated into the energy recovery cylinder such that the volume of the energy recovery cylinder is unaffected by the pressure in the pressure store when the pressure in the energy recovery cylinder is below a maximum pressure and
   wherein the pressure store has an operating pressure which is greater than or equal to an operating pressure of the chamber filled with gas.

2. A working device in accordance with claim 1, wherein the pressure store has a predetermined operating pressure which defines the maximum pressure, wherein the pressure store advantageously has no influence on the pressure in the chamber filled with gas below the maximum pressure, and/or the pressure store has a characteristic differing from the chamber filled with gas, with the pressure store advantageously having a smaller influence on the pressure in the chamber filled with gas below the maximum pressure than above the maximum pressure.

3. A working device in accordance with claim 2, wherein a pressure relief valve for the chamber filled with gas is provided, with the maximum pressure being below the triggering pressure of the pressure relief valve.

4. A working device in accordance with claim 3, wherein the pressure store equalizes pressure peaks which can occur briefly during the compression of the chamber filled with gas, and/or the maximum pressure is above the pressures present in the chamber filled with gas with a static working device and a maximum load.

5. A working device in accordance with claim 4, wherein the pressure store is in fluid communication via a line with the chamber filled with gas, with the pressure store advantageously being attached to the energy recovery cylinder.

6. A working device in accordance with claim 3, wherein the pressure store is in fluid communication via a line with the chamber filled with gas, with the pressure store advantageously being attached to the energy recovery cylinder.

7. A working device in accordance with claim 2, wherein the pressure store equalizes pressure peaks which can occur briefly during the compression of the chamber filled with gas, and/or the maximum pressure is above the pressures present in the chamber filled with gas with a static working device and a maximum load.

8. A working device in accordance with claim 7, wherein the pressure store is in fluid communication via a line with the chamber filled with gas, with the pressure store advantageously being attached to the energy recovery cylinder.

9. A working device in accordance with claim 1, wherein a pressure relief valve for the chamber filled with gas is provided, with the maximum pressure being below the triggering pressure of the pressure relief valve.

10. A working device in accordance with claim 9, wherein the pressure store equalizes pressure peaks which can occur briefly during the compression of the chamber filled with gas, and/or the maximum pressure is above the pressures present in the chamber filled with gas with a static working device and a maximum load.

11. A working device in accordance with claim 10, wherein the pressure store is in fluid communication via a line with the chamber filled with gas, with the pressure store advantageously being attached to the energy recovery cylinder.

12. A working device in accordance with claim 9, wherein the pressure store is in fluid communication via a line with the chamber filled with gas, with the pressure store advantageously being attached to the energy recovery cylinder.

13. A working device in accordance with claim 1, wherein the pressure store equalizes pressure peaks which can occur briefly during the compression of the chamber filled with gas, and/or the maximum pressure is above the pressures present in the chamber filled with gas with a static working device and a maximum load.

14. A working device in accordance with claim 13, wherein the pressure store is in fluid communication via a line with the chamber filled with gas, with the pressure store advantageously being attached to the energy recovery cylinder.

15. A working device in accordance with claim 1, wherein the pressure store is in fluid communication via a line with the chamber filled with gas, with the pressure store advantageously being attached to the energy recovery cylinder.

16. A working device in accordance with claim 1, wherein the energy recovery cylinder is filled with gas at a base side and has a hollow piston rod.

17. A working device in accordance with claim 16, wherein a piston is displaceably supported in the hollow piston rod of the energy recovery cylinder through which the base side filled with gas is in operative communication with the pressure store.

18. A working device in accordance with claim 17, wherein the region in the interior of the hollow piston rod separated from the base side by the piston is filled with gas.

19. An energy recovery cylinder for a working device in accordance with claim 1.

* * * * *